Jan. 15, 1929.

W. J. CAMPBELL 1,698,875

SLICING MACHINE

Filed March 12, 1928   2 Sheets-Sheet 1

Inventor
William J. Campbell
by Parker & Carter
Attorneys.

Jan. 15, 1929.

W. J. CAMPBELL

SLICING MACHINE

Filed March 12, 1928

Inventor
William J. Campbell
by Parker & Carter
Attorneys

Patented Jan. 15, 1929.

1,698,875

UNITED STATES PATENT OFFICE.

WILLIAM J. CAMPBELL, OF INDIANAPOLIS, INDIANA, ASSIGNOR TO AMERICAN SLICING MACHINE COMPANY, OF CHICAGO, ILLINOIS, A CORPORATION OF NEW YORK.

SLICING MACHINE.

Application filed March 12, 1928. Serial No. 260,845.

My invention relates to a slicing machine and has for particular purpose to provide a carriage, mounted for movement across the plane of the knife of said slicing machine, which carriage shall be adjustable to handle both large and small pieces of meat, bread or the like. Other objects will appear from time to time in the course of the specification and claims.

I illustrate my invention more or less diagrammatically in the accompanying drawings, wherein—

Like parts are indicated by like symbols throughout the specification and drawings.

A generally indicates a slicing machine base and $A^1$ a rotary knife mounted thereupon, the driving means for which are not shown as being unimportant in connection with the present application.

B indicates any suitable track or guide arrangement along which is movable the carriage member $B^1$ which may be steadied for example by the lower track $B^2$ engaged by the downward projection $B^3$ of the carriage. $B^4$ is any suitable handle whereby the carriage assembly may be moved to and fro along the track B. Mounted upon the carriage are the working engaging members C, $C^1$ pivoted respectively at $C^2$ and $C^3$ and provided with the slotted adjusting segments $C^4$ $C^5$ penetrated by the locking bolts $C^6$ $C^7$. The segments are preferably so proportioned that when the members C and $C^1$ are in their uppermost position they lie in planes generally perpendicular to each other, as shown in Figures 1 and 5, at the convenient angle to hold a piece of bread, meat or the like which may be advanced along the guiding support so provided for contact with the knife.

Figure 3:
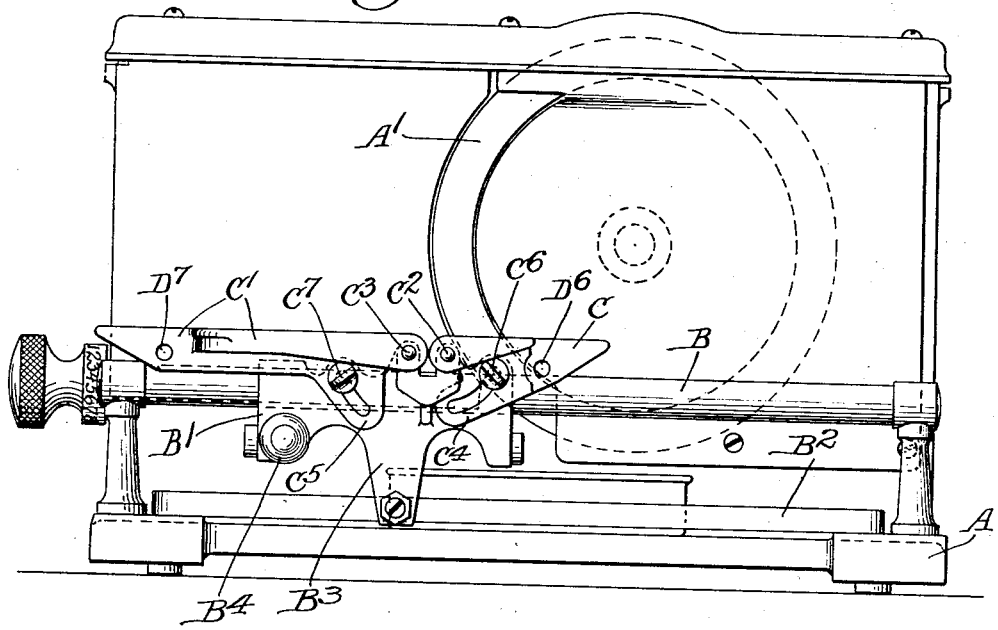
Figure 3 is a side elevation similar to Figure 1 with the parts in a different position.

When the members C and $C^1$ are shown in position in which they are indicated in Figure 3 a single broad supporting surface, generally horizontal, is provided. This is particularly useful for cutting larger sized pieces of meat or for decrusting loaves of bread or for taking the rind off of large pieces of bacon. In other words a broad extended uninterrupted support is provided upon which large objects may be positioned for cutting or trimming.

Figure 1:
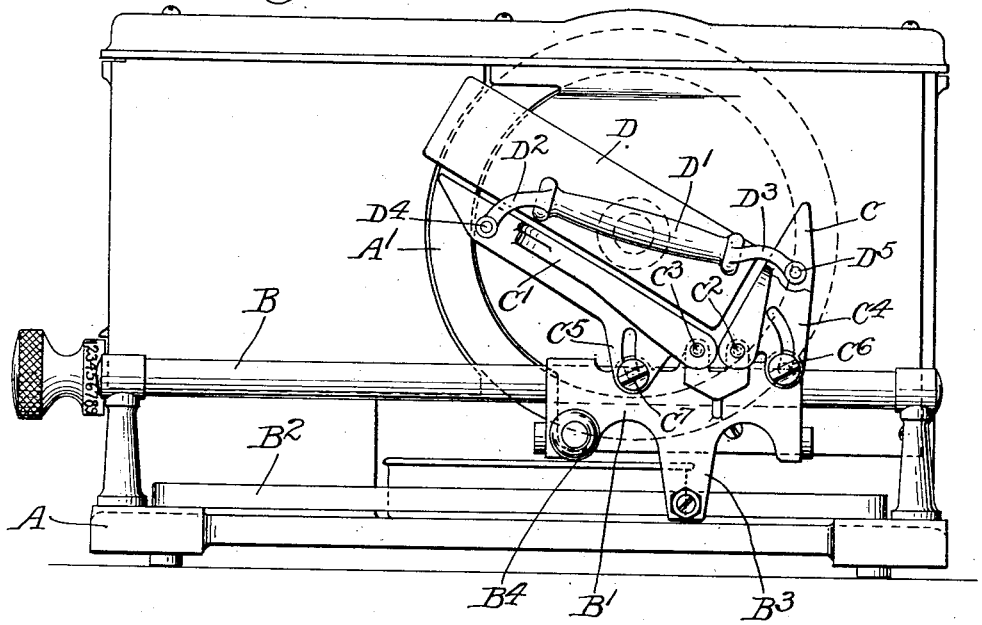
Figure 1 is a side elevation.
Figure 2:
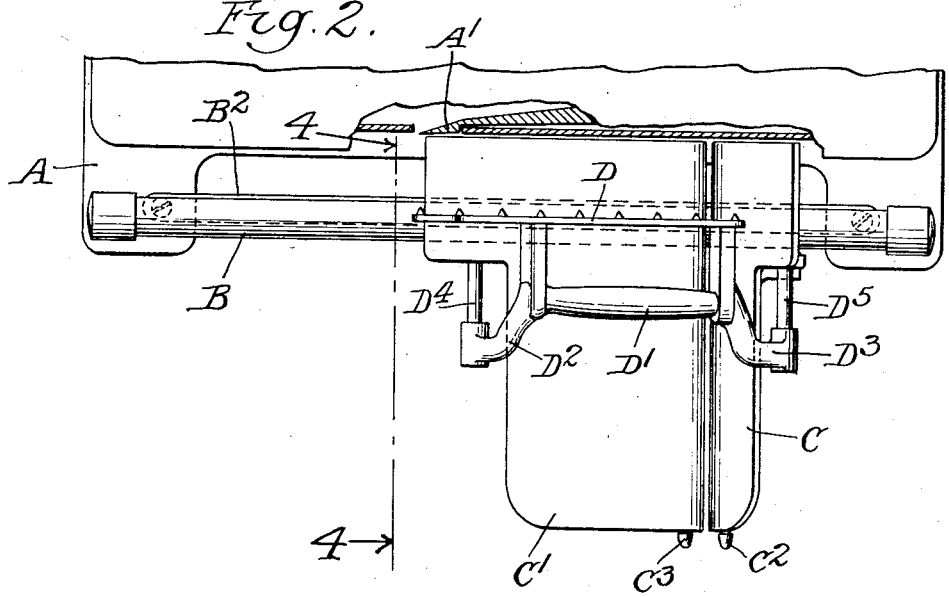
Figure 2 is a plan view with parts broken away.
Figure 5:
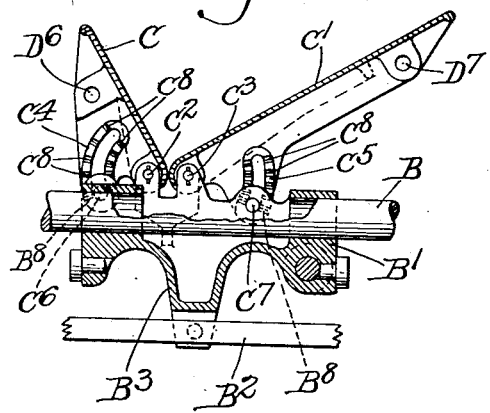
Figure 5 is a section on the line 5—5 of Figure 4.
Figure 4:
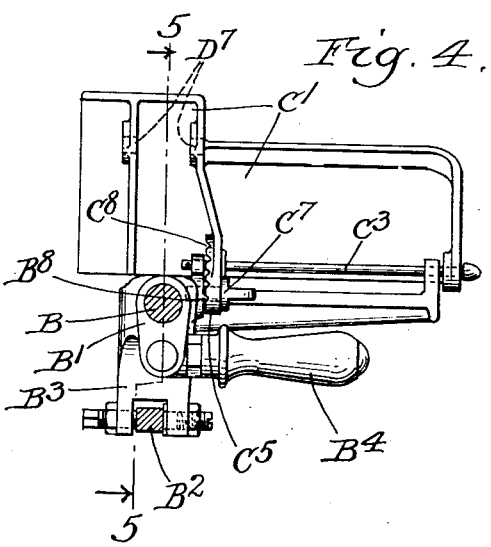
Figure 4 is a section on the line 4—4 of Figure 2.

When the members C and $C^1$ are in the position in which they are shown in Figures 1 and 5 they are useful for cutting smaller pieces of meat and the like. In such case it is desirable to provide a pusher plate for advancing the work towards the knife. I therefore provide such a plate herein shown as D with the handle $D^1$ and lateral extensions $D^2$ $D^3$ from the handle, upon which are mounted guiding pins $D^4$ $D^5$ which penetrate apertures $D^6$ $D^7$ herein shown as formed in lugs on the members C and $C^1$ respectively. The members C and $C^1$ are shown in their two extreme positions of adjustment. They may also be adjusted to any intermediate position, to accommodate the machine for use with different sizes of pieces of meat and the like, and may be firmly held in position by the engagement of one of the projections $B^8$ on the carriage $B^1$, with the opposed notches $C^8$ in the segments, the clamp screw $C^6$ $C^7$ being tightened to hold the members in adjustment.

When the members C and $C^1$ are in the extended or horizontal position the pusher plate is of course removed, and in fact must be moved to permit their rotation into horizontal position.

It will be realized that whereas I have described and illustrated a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

I claim:

1. In combination with a slicing machine having a knife and means for rotating it, a carriage and means for guiding said carriage across the face of the knife, a plurality of work engaging and supporting elements mounted upon said carriage, and means for varying the angular relation of said elements, 2. In combination with a slicing machine having a knife and means for rotating it, a carriage and means for guiding said carriage across the face of the knife, a plurality of work engaging and supporting elements pivoted upon said carriage, and means for varying the angular relation of said elements.

3. In combination with a slicing machine having a knife and means for rotating it, a carriage and means for guiding said carriage across the face of the knife, a plurality of work engaging and supporting elements mounted upon said carriage, and means for independently adjusting them.

4. In combination with a slicing machine having a knife and means for rotating it, a carriage and means for guiding said carriage across the face of the knife, a plurality of work engaging and supporting elements pivoted upon said carriage, and means for independently adjusting them.

5. In combination with a slicing machine having a knife and means for rotating it, a carriage and means for guiding said carriage across the face of the knife, a plurality of work engaging and supporting elements pivoted upon said carriage, and means for independently adjusting them, including a slotted segment for each such member and a locking means associated therewith.

6. In combination with a slicing machine having a knife and means for rotating it, a carriage and means for guiding said carriage across the face of the knife, a plurality of work engaging and supporting elements mounted upon said carriage, and means for varying the angular relation of said elements, said members when at one limit of their adjustment being adapted to lie in a single plane.

7. In combination with a slicing machine having a knife and means for rotating it, a carriage and means for guiding said carriage across the face of the knife, a plurality of work engaging and supporting elements pivoted upon said carriage, and means for varying the angular relation of said elements, said members when at one limit of their adjustment being adapted to lie in a single plane.

8. In combination with a slicing machine having a knife and means for rotating it, a carriage and means for guiding said carriage across the face of the knife, a plurality of work engaging and supporting elements mounted upon said carriage, and means for varying the angular relation of said elements, said members when at one limit of their adjustment being adapted to lie in a single horizontal plane.

9. In combination with a slicing machine having a knife and means for rotating it, a carriage and means for guiding said carriage across the face of the knife, a plurality of work engaging and supporting elements pivoted upon said carriage, and means for varying the angular relation of said elements, said members when at one limit of their adjustment being adapted to lie in a single horizontal plane.

10. In combination with a slicing machine having a knife and means for rotating it, a carriage and means for guiding said carriage across the face of the knife, a plurality of work engaging and supporting elements mounted upon said carriage, and means for varying the angular relation of said elements, the range of adjustment of said members extending from approximately 90 degrees to approximately 180 degrees.

11. In combination with a slicing machine having a knife and means for rotating it, a carriage and means for guiding said carriage across the face of the knife, a plurality of work engaging and supporting elements pivoted upon said carriage, and means for varying the angular relation of said elements, the range of adjustment of said members extending from approximately 90 degrees to approximately 180 degrees.

12. In combination with a slicing machine having a knife and means for rotating it, a carriage and means for guiding said carriage across the face of the knife, a plurality of work engaging and supporting elements mounted upon said carriage, and means for varying the angular relation of said elements, the range of adjustment of said members extending from approximately 90 degrees to approximately 180 degrees, said members, when at maximum extension, being adapted to lie in a generally horizontal plane.

13. In combination with a slicing machine having a knife and means for rotating it, a carriage and means for guiding said carriage across the face of the knife, a plurality of work engaging and supporting elements pivoted upon said carriage, and means, for independently adjusting them and guiding means, associated with said elements and adapted to serve as a pusher plate guide.

14. In combination with a slicing machine having a knife and means for rotating it, a carriage and means for guiding said carriage across the face of the knife, a plurality of work engaging and supporting elements pivoted upon said carriage, and means for independently adjusting them, guiding means, associated with each said element, said guiding means adapted to cooperate, when the two elements are in a predetermined angular relation, to serve as a pusher plate guide.

15. In combination with a slicing machine having a knife and means for rotating it, a carriage and means for guiding said carriage across the face of the knife, a plurality of work engaging and supporting elements pivoted upon said carriage for rotation about axes at right angles to the path of movement of the carriage, and means for adjusting them.

16. In combination with a slicing machine having a knife and means for rotating it, a carriage and means for guiding said carriage across the face of the knife, a plurality of work engaging and supporting elements pivoted upon said carriage, and means for adjusting them.

Signed at Indianapolis, county of Marion and State of Indiana, this 3d day of March, 1928.

WILLIAM J. CAMPBELL.